No. 643,470. Patented Feb. 13, 1900.
F. M. CLOUGH.
MATCH MAKING MACHINE.
(Application filed July 19, 1897. Renewed Oct. 19, 1899.)
(No Model.) 9 Sheets—Sheet 2.

No. 643,470. Patented Feb. 13, 1900.
F. M. CLOUGH.
MATCH MAKING MACHINE.
(Application filed July 19, 1897. Renewed Oct. 19, 1899.)
(No Model.) 9 Sheets—Sheet 3.

Witnesses:
Jas. E. Hutchinson
Henry C. Hazard

Inventor.
Fred M. Clough
by Prindle and Russell
his Attorneys

No. 643,470. Patented Feb. 13, 1900.
F. M. CLOUGH.
MATCH MAKING MACHINE.
(Application filed July 19, 1897. Renewed Oct. 19, 1899.)

(No Model.) 9 Sheets—Sheet 4.

No. 643,470. Patented Feb. 13, 1900.
F. M. CLOUGH.
MATCH MAKING MACHINE.
(Application filed July 19, 1897. Renewed Oct. 19, 1899.)
(No Model.) 9 Sheets—Sheet 5.
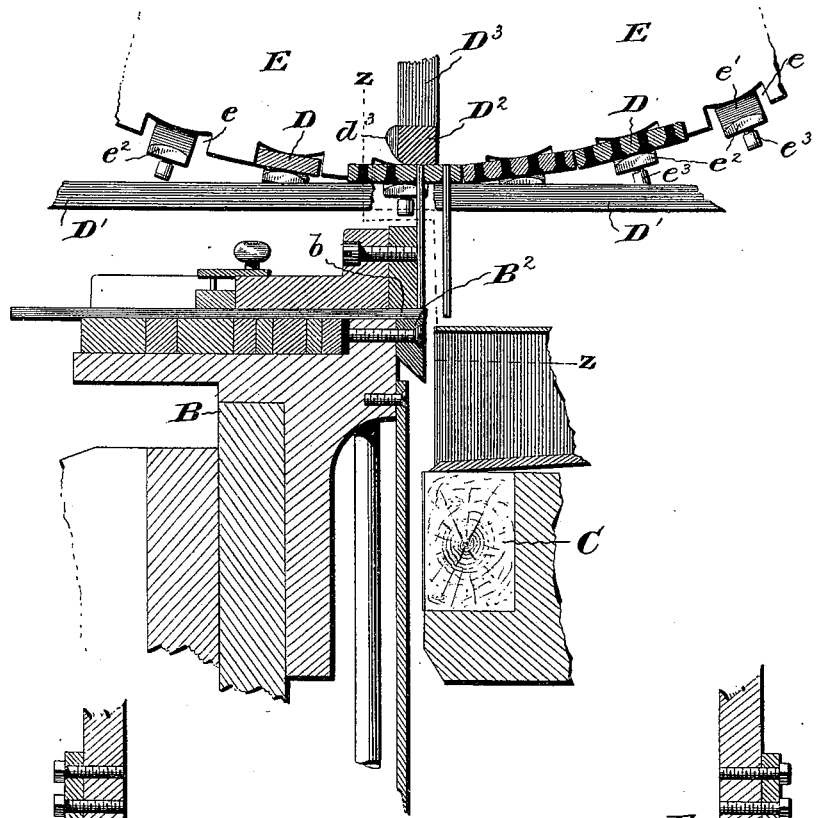
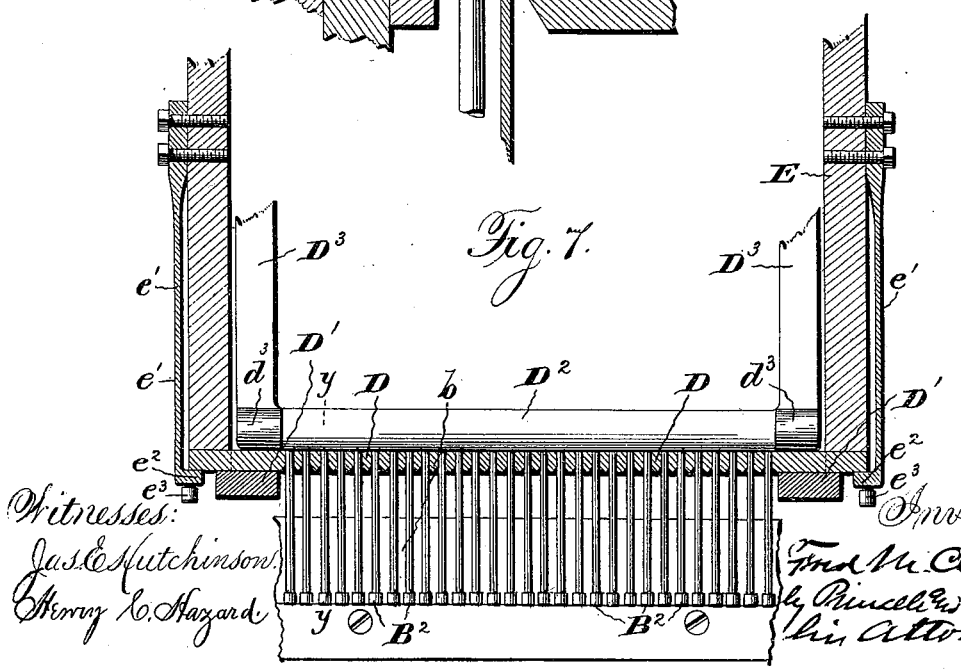

No. 643,470. Patented Feb. 13, 1900.
F. M. CLOUGH.
MATCH MAKING MACHINE.
(Application filed July 19, 1897. Renewed Oct. 19, 1899.)

(No Model.) 9 Sheets—Sheet 6.

Witnesses:
Jas. E. Hutchinson.
Henry C. Hazard.

Inventor.
Fred M. Clough
by Pindle & Russell
his Attorneys

THE NORRIS PETERS CO., PHOTO-LITHO., WASHINGTON, D. C.

No. 643,470. Patented Feb. 13, 1900.
F. M. CLOUGH.
MATCH MAKING MACHINE.
(Application filed July 19, 1897. Renewed Oct. 19, 1899.)
(No Model.) 9 Sheets—Sheet 7.

Witnesses:
Jas. E. Hutchinson.
Henry C. Hazard.

Inventor.
Fred M. Clough
by Prindle and Russell
his Attorneys

No. 643,470. Patented Feb. 13, 1900.
F. M. CLOUGH.
MATCH MAKING MACHINE.
(Application filed July 19, 1897. Renewed Oct. 19, 1899.)
(No Model.) 9 Sheets—Sheet 8.
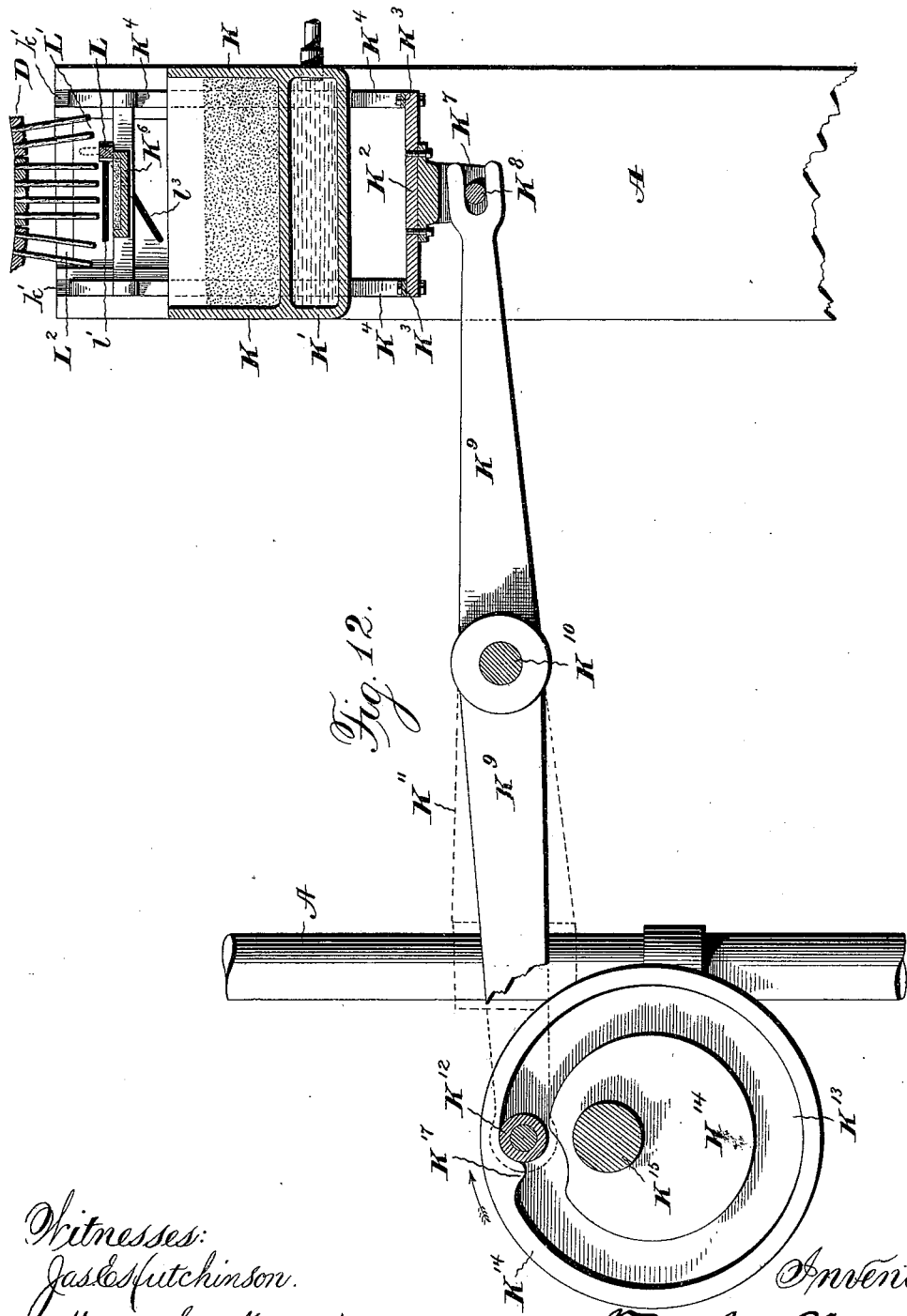

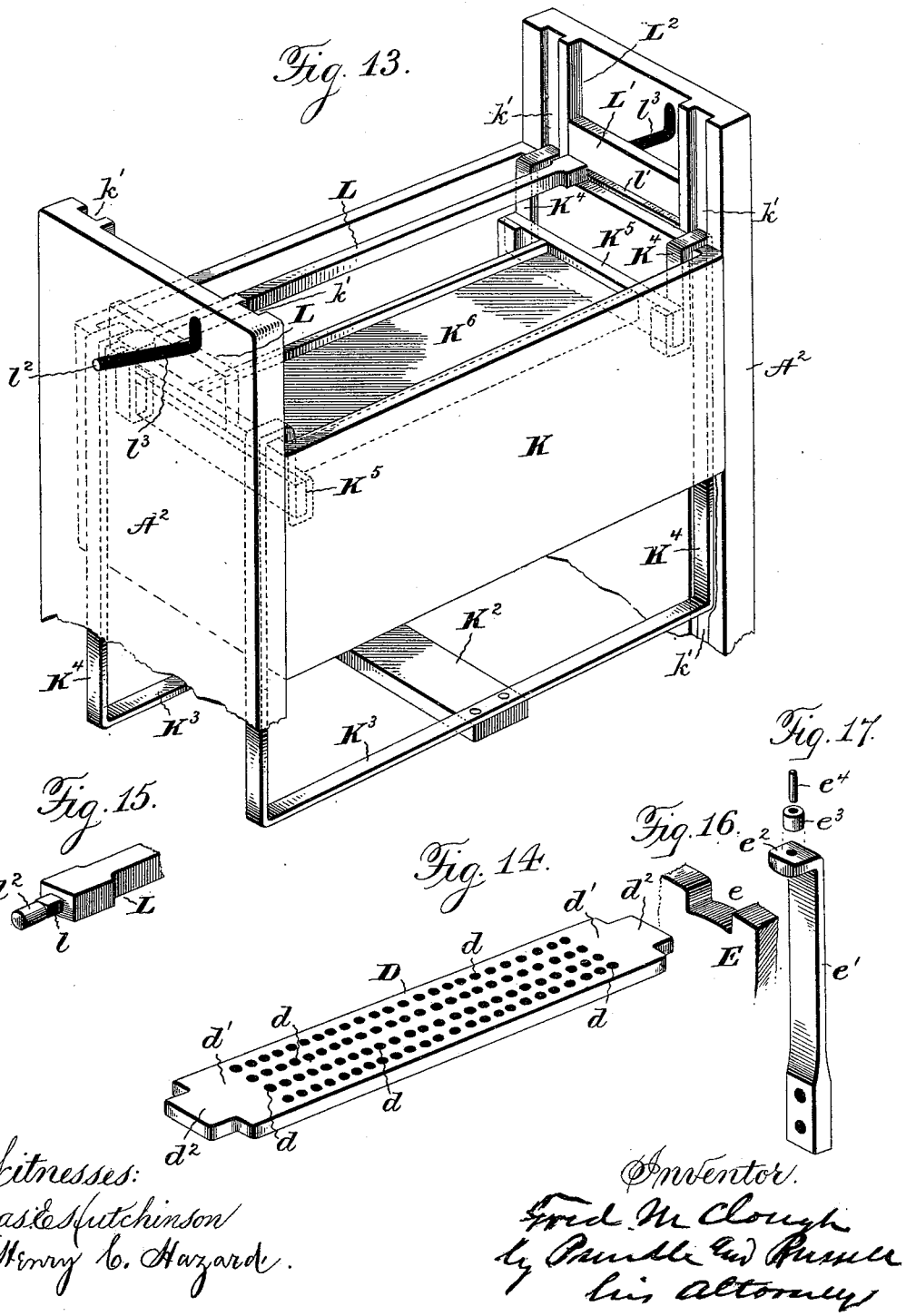

UNITED STATES PATENT OFFICE.

FRED M. CLOUGH, OF ATHOL, MASSACHUSETTS, ASSIGNOR TO THE DIAMOND MATCH COMPANY, OF CHICAGO, ILLINOIS.

MATCH-MAKING MACHINE.

SPECIFICATION forming part of Letters Patent No. 643,470, dated February 13, 1900.

Application filed July 19, 1897. Renewed October 19, 1899. Serial No. 734,136. (No model.)

*To all whom it may concern:*

Be it known that I, FRED M. CLOUGH, of Athol Center, in the county of Worcester, and in the State of Massachusetts, have invented certain new and useful Improvements in Match-Making Machines; and I do hereby declare that the following is a full, clear, and exact description thereof, reference being had to the accompanying drawings, in which—

Figure 1:
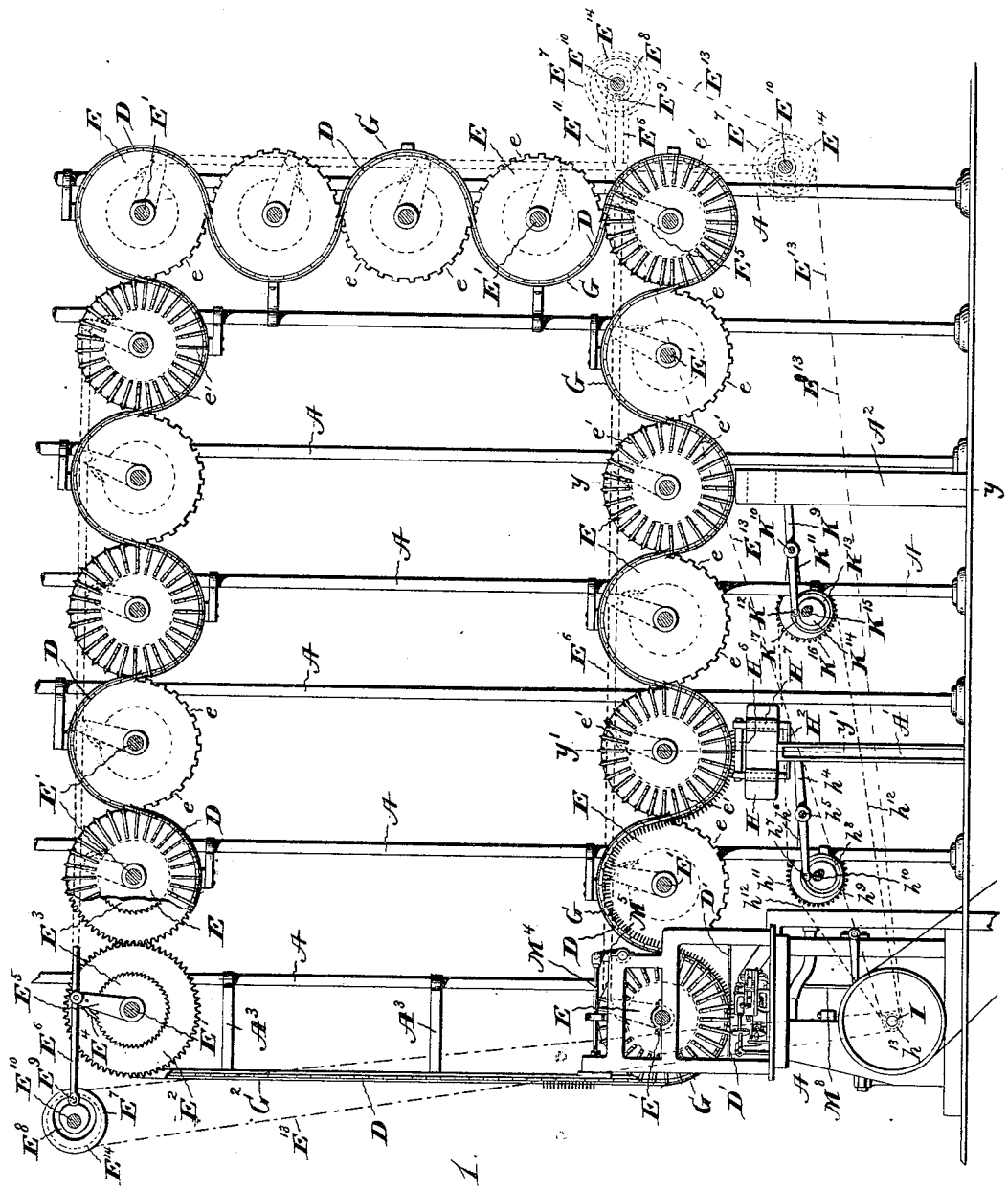
Figure 2:
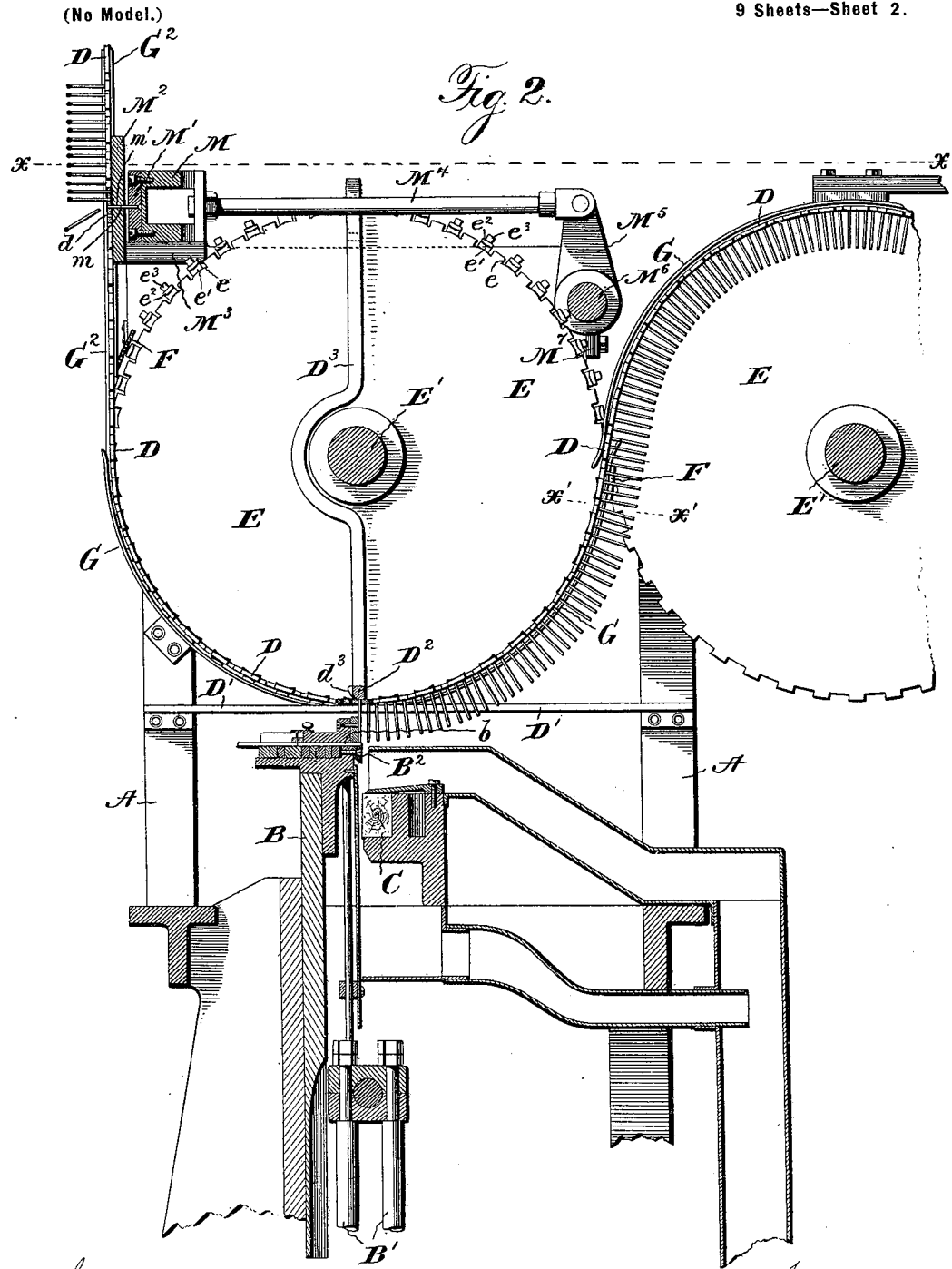
Figure 3:
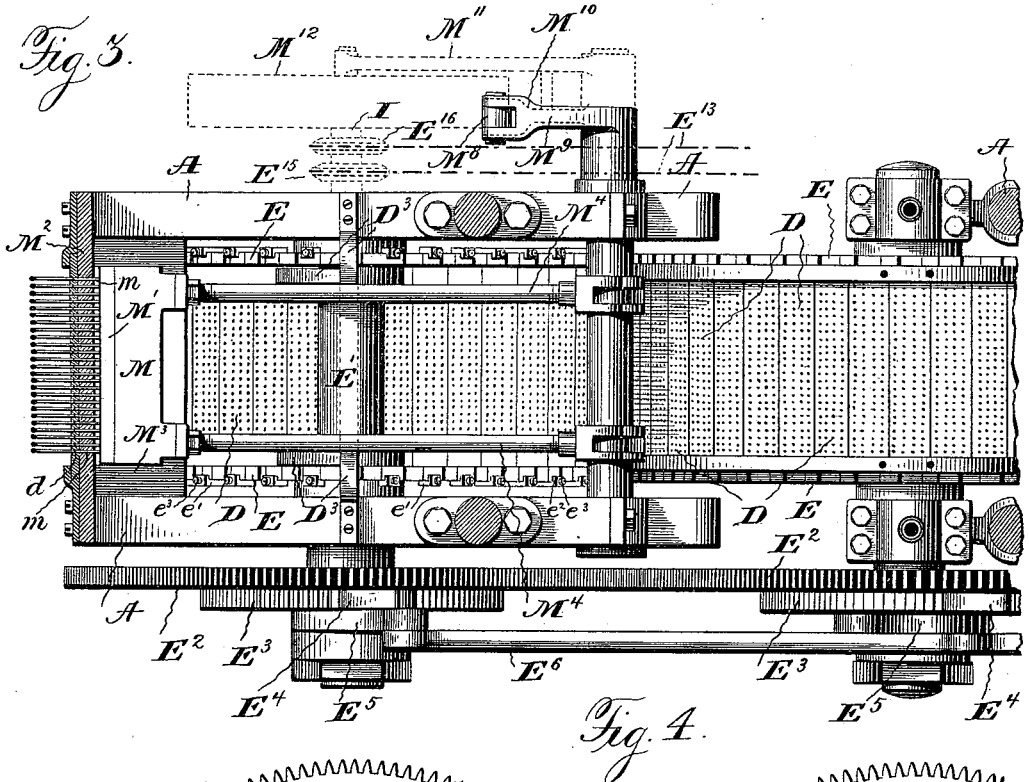
Figure 4:
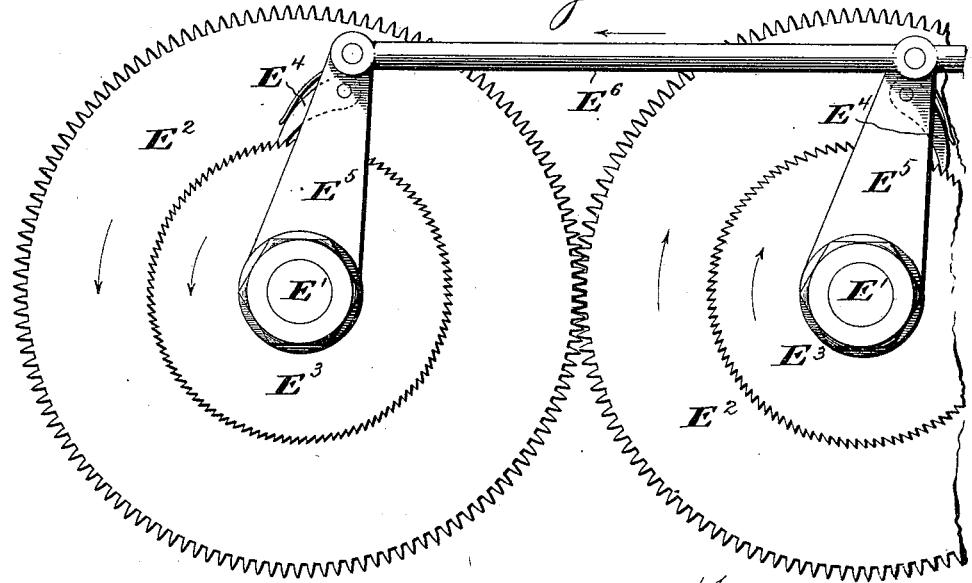
Figure 5:
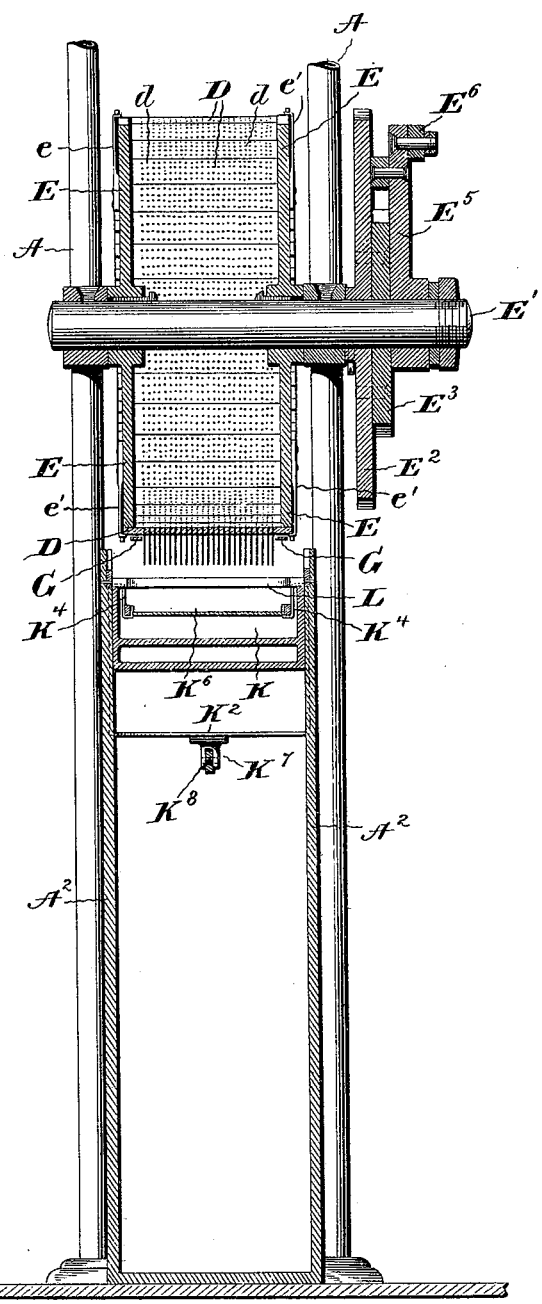
Figure 8:
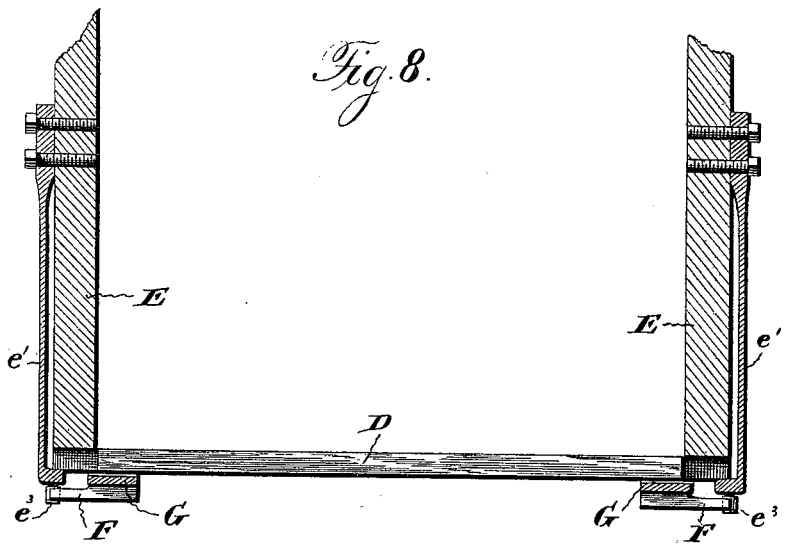
Figure 9:
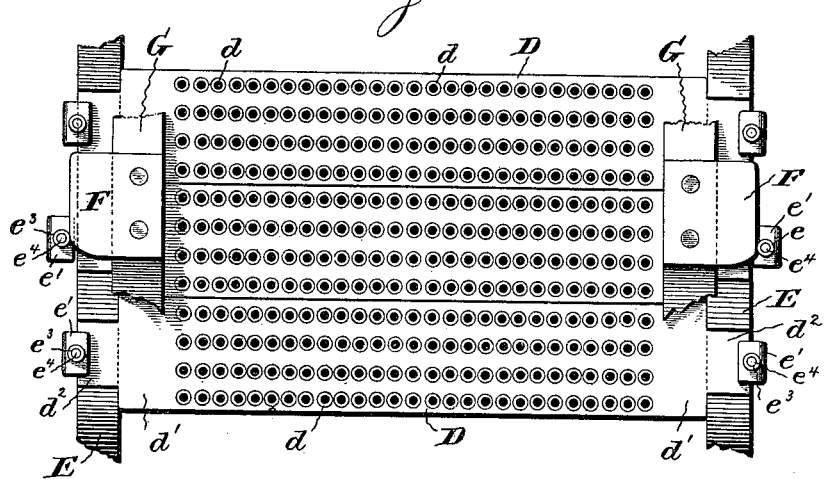
Figure 10:
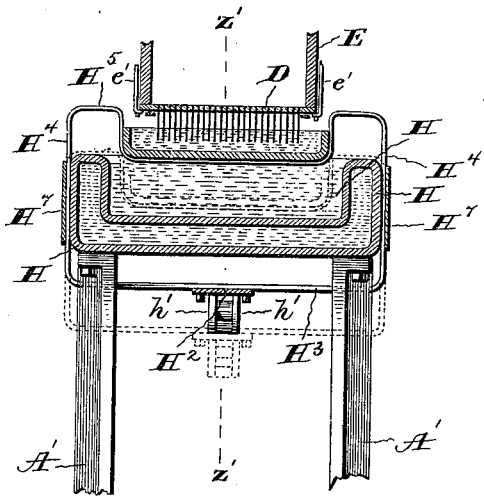
Figure 11:
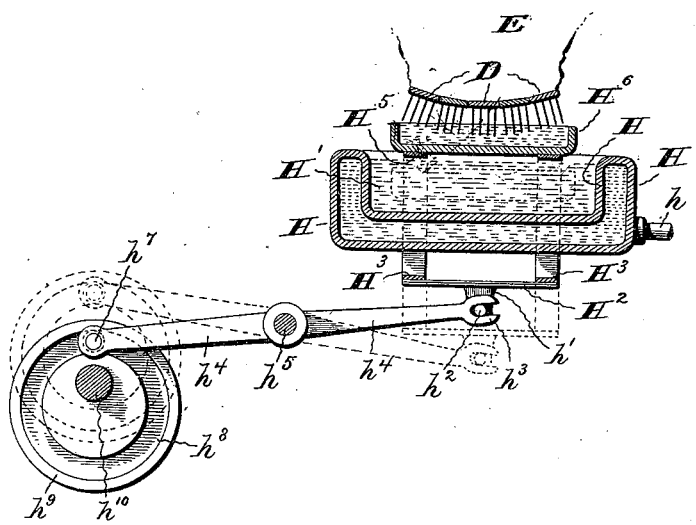

Figure 1 shows a view of my machine, partly in side elevation and partly in vertical section; Fig. 2, a detail view on an enlarged scale, showing a vertical section of a portion of the end of my machine where the splint cutting, sticking, and the match-ejecting devices are situated; Fig. 3, a view of a section on line $xx$ of Fig. 2; Fig. 4, a detail view on an enlarged scale, showing in side elevation the means for rotating the carrier-plate-supporting wheels; Fig. 5, a detail sectional view showing, on an enlarged scale, a section on line $yy$ of Fig. 1; Fig. 6, a detail sectional view showing, on an enlarged scale, a vertical section of the splint cutting and sticking devices and several of the carrier-plates with the parts in position, as when a row of splints is being inserted in a row of perforations in one of the carrier-plates; Fig. 7, a view of a section on line $zz$ of Fig. 6; Fig. 8, a detailed sectional view showing, on an enlarged scale, a section on line $x'x'$ of Fig. 2; Fig. 9, a view in rear elevation of the part of the machine shown in section in Fig. 8; Fig. 10, a detail sectional view showing, on an enlarged scale, a section on line $y'y'$ of Fig. 1; Fig. 11, a view of a section on line $z'z'$ of Fig. 10; Fig. 12, a detail sectional view showing, on an enlarged scale, the composition-applying mechanism used in my machine; Fig. 13, a detail perspective view showing, on an enlarged scale, the composition-applying devices with the actuating lever and cam removed; Fig. 14, a detail perspective view showing, on an enlarged scale, one of the carrier-plates; Fig. 15, a similar view showing the end of the scraper or evener for the composition-applying device; Fig. 16, a like view of a portion of one of the carrier-plate-supporting wheels, and Fig. 17 a similar view of one of the plate-retaining latches with its roller and pin separated from it and from each other.

Letters of like name and kind refer to like parts in each of the figures.

The object of my invention has been to provide an improved match-making machine of the kind in which the match sticks or splints are inserted in a carrier, by which they are conveyed to and past the dipping devices intended to make matches of the splints; and to this end my invention consists in the machine and in the arrangement, construction, and combination of the parts thereof, as hereinafter specified.

While I have shown my invention as arranged to make use of the block-feeding and splint cutting and sticking mechanism such as is shown and described in the United States patent to Beecher, No. 389,435, and shall hereinafter describe my machine as having such mechanism for supplying the splints and sticking them in the carrier-plates used by me, I desire it to be understood that I do not limit myself to such form of splint supplying and sticking mechanism, but contemplate using instead where desired any other suitable means or mechanism for furnishing splints and inserting them in the carrier-plates. Any other suitable means for cutting and sticking the splints or for taking them after they have been cut and thrusting them into the grasp of the carrier can be employed in my machine without involving departure from my invention.

As the splint cutting and sticking devices appearing in my machine shown and described herein are the same as those for the same purpose fully set forth and explained both in respect to their construction and operation in the Beecher patent referred to, I need not show nor describe them at length herein, but would refer to such patent for a full showing and description of them and their operation.

In the drawings of this application, A A designate the frame for supporting the various operative parts of the machine, and B designates the reciprocating cutting-head, which, as set forth in the Beecher patent referred to, is guided in suitable guides on the frame and is actuated by the rods B' B', pivotally connected with the head, and themselves to be actuated through suitable connections from a revolving crank on the main shaft, all as set forth in the patent referred to. This head B carries a series of tubular cutters b b, adapted to cut splints from blocks of wood fed up close to the path of the head, as indicated at C. Such cutters are during the downward movement of the head projected beyond the rear side of the head, so as to be in position to cut down through the blocks of wood at C and separate a series of match-splints therefrom. The cutters are then drawn in on the head, so as to bring their tubular portions, which retain the lower ends of the cut splints, in them over the fixed abutment $B^2$, which affords a support for the lower ends of the splints to prevent their being pushed down through the cutters as the head B rises and forces the row of splints held by the cutters into the perforations of the carrier-plates to be described.

The operation of the cutters, of the means for moving them, and of the splint-supporting abutment is the same as that set forth in the patent referred to.

Instead of using an endless continuous carrier for the splints, composed of a series of plates provided with rows of splint receiving and holding perforations and hinged together so as to form a chain of plates like that of the machine of the said patent, I employ for my splint-carrier a series of separate carrier-plates D D, each provided with one or more (preferably four) rows of perforations $d\ d$ to receive and hold the splints, such perforations being made slightly smaller in diameter than the splints, so that when the splint ends are thrust into them such ends will be slightly compressed and so grasped firmly enough to insure a steady and continuous holding of the splints in positions at right angles to the respective plates and parallel with each other.

In my machine the plates D D, while not being hinged together, are always kept close to each other as they are moved along, so as to form a substantially continuous carrier, the rows of perforations in them being so arranged that the distance between the last row of perforations on one plate and the first row on the next succeeding plate is the same as the distance between the rows of perforations on any one plate.

In order to move the plates of my carrier along while keeping them close together, I provide a series of pairs of wheels E E, fixed on and rotating with shafts E' E', journaled in suitable bearings on parts of frame A A. Each of these wheels E E has a series of notches $e\ e$, having a width about equal to one-half the width of one of the plates D D, the notches on one wheel of each pair being arranged to come directly opposite to the notches in the other wheel of the pair. Each of these notches $e\ e$ on the first pair of wheels E E has its bottom made convex, as shown best in Figs. 6 and 16, for a purpose to be explained hereinafter.

The plates D D have beyond the opposite ends of their series of perforations $d\ d$ parts $d'\ d'$, which are to engage guides to be described, and beyond these portions are cut away on each side of their ends, so as to leave centrally-located lugs $d^2\ d^2$ of a width equal to half that of a plate. These lugs are the portions of the plates which are engaged by the notches $e\ e$ on wheels E E, such notches being of a size to admit the lugs freely, while fitting them closely enough to prevent any considerable play of the lugs back and forth in the notches.

The first pair of wheels E E is directly over the hereinbefore-described splint cutting and sticking head B and situated with reference to such head so that a plate D, having its lugs $d^2\ d^2$ engaging the lowest notches $e\ e$ on the under side of the wheels, will be at a sufficient distance from the head B to properly receive in its perforations any splints cut and carried up by the head.

In order that each plate as it stands and is passed along over the head B may be in position with its under face at right angles to the travel of the head B, so that the perforations in any row brought over the head may have their axes exactly vertical and in line with the splints to be raised and thrust into them by the said head, I provide the two horizontal guide-strips D' D', secured upon the frame A A so as to form straight sliding supports for the under sides of the plain imperforated parts $d'\ d'$ of the plates.

To hold each plate as it passes along over the guide-strips D' D' flat down upon the latter, so that its position will be exactly at right angles to the plane of travel of head B until all of the rows of perforations of such plate have been brought over and passed by the line of travel of the splints carried by the head, I provide a cross-bar $D^2$, adapted to engage the upper side of the plate. The under side of this bar $D^2$, which engages the plate, is made parallel to the guide-strips D' D', as shown, (see Figs. 2 and 6,) a beveled surface or upward and rearward incline $d^3$ being provided on the side of the bar which the plates D D first strike to guide the plates easily under the bar as they are moved along by the rotation of wheels E E. The cross-bar $D^2$ is supported on the two side arms $D^3 D^3$, extending from opposite sides of frame A A down close to the inner sides of the two wheels E E. (See Figs. 2, 3, and 7.)

As the passage of each plate D between cross-bar $D^2$ and the guide-strips D' D' causes the plate to travel for a time in a straight line, while the notched peripheries of the wheels E E, engaging the lugs $d^2 d^2$ on the plate, must travel in a curved line, it is necessary to provide for a change of angle of the plate with reference to the radii of such wheels. For this purpose the bottoms of notches $e\ e$ are made convex, as hereinbefore described, and shown in the drawings, in order to allow such plate to have a rocking motion with reference to the wheels E E.

The flat horizontal under side of bar $D^2$ besides serving with the guide-strips $D'$ $D'$ to insure the straight horizontal travel of the plates also serves as an abutment to limit the upward travel of the match-splints and prevents any splints from being thrust farther through one of the plate-perforations $e$ $e$ than the other splints. This insures that the lower ends of the splints which are to be dipped and receive the igniting composition to form the match-heads shall all be in the same plane and therefore in position to be uniformly dipped and treated with composition.

In order to support the plates D D from the first pair of wheels E E and do away with all necessity for supporting-guides over which these plates would have to be slid with a retarding friction due to their weight, I provide such first pair of wheels E E, which move the plates past the strips $D'$ $D'$ and bar $D^2$, with spring-latches $e'$ $e'$, one for each notch $e$ $e$, attached to the sides of the wheels E E, and each having a lip $e^2$, adapted to project inward over the end of that lug $d^2$ on the plate D which may be seated in the respective notch $e$. The lug-engaging faces of these lips $e^2$ $e^2$ are made convex for the same reason that the bottoms of notches $e$ $e$ are—that is, to allow the plates D D to rock with reference to the moving wheels E E, so that the plates can travel in a straight horizontal line for a time while they are passing between guide-strips $D'$ $D'$ and bar $D^2$. The other pairs of wheels E E for supporting and moving the carrier-plates D D do not have their notches with convex bottoms, but are formed with flat bottoms, against which the lugs $d^2$ $d^2$ on the carrier-plates can be squarely seated. After passing the splint cutting and sticking devices and having their rows of perforations filled with splints thereby the carrier-plates D D, supported in the notches of the first pair of wheels E E by the latches $e'$ $e'$, are carried onward and upward by the rotation of such wheels to the point where the peripheries of the latter come close to the peripheries of the next or second pair of notched wheels E E. As a carrier-plate approaches this point its lugs $d^2$ $d^2$ are released by their respective latches $e'$ $e'$, which are forced outward to take their lips $e^2$ $e^2$ beyond the ends of the plate-lugs by stationary cam-plates F F, supported on the guide-strips G G, secured to the frame A A, engaging antifriction-rollers $e^3$ $e^3$ on the pins $e^4$ $e^4$, carried by the latches. (See Figs. 2, 8, and 9.) When the lugs $d^2$ $d^2$ of any one plate have been thus released by the respective latches $e'$ $e'$, the onward movement of the plate caused by the rotation of the wheels E E, in the notches of which the plate-lugs have been held, causes the plain imperforated end portion of the plate close to the lugs to come in contact with the inclined lower ends of the two curved guide-strips G G, supported from opposite sides of frame A A. The lower portions of these strips are inclined, so as to cross the path of the plates carried by the first wheels E E and guide such plates over to transfer their end lugs from the notches $e$ $e$ of such wheels into the corresponding notches of the second pair of wheels E E. The latter wheels, being notched in a direction opposite to that of the rotation of the first pair of wheels, then carry the transferred carrier-plates, with the splints in their perforations, upward and inward, the weight of such plates being supported by the wheels through the plate-lugs resting in the wheel-notches.

The plate-shifting guide-strips do not have to support the weight of the plates and need not be in contact with the plates to offer the resistance of any sliding friction except just at the point where they cross the path of the plates supported on the first wheels and shift such plates from such wheels to the second wheels in the manner indicated above.

There are curved guide-strips G G extending around just below or outside of the path of the plates D D where the latter are supported from the first pair of wheels E E, but they are only safety guide-strips adapted to support one end of any plate which might fail to be supported by its respective latch $e'$ because of the latch becoming broken or failing to act through some accident; but such strips do not frictionally engage the plates or serve to support them or any of their weight after the plate-lugs have become engaged by the respective latches $e'$ $e'$ on the wheels.

The plates D D are carried by the second pair of notched wheels upward, over, and then downward to the point where the peripheries of such wheels come close to the peripheries of the third pair of notched wheels E E, and then are shifted by the transfer-guides G G to take their end lugs $d^2$ $d^2$ from the notches of the second pair of wheels and seat them in the notches of the third pair. The plate-shifting portions of the guides G G for thus shifting the carrier-plates are made, like the corresponding portions of guides G G hereinbefore described, inclined, so as to stand at an acute angle to and across the path of the plates as carried by the wheels, from which the plates are to be shifted.

The third pair of wheels E E is made just like the first pair hereinbefore described except as to the shape of the notches, which are not made with convex bottoms, as in the case of the first wheels. Each wheel of the third pair has a series of spring-latches, one for each notch $e$, to engage and hold in such notch an end lug $d^2$ on a carrier-plate, the latches being the same in form and operation as those on the first pair of wheels, except that they need not be made convex on their inner or lug-engaging faces. Latch-tripping cams F F, like those already described, are situated so as to spring back the corresponding latches of the two wheels of the third pair out of the path of the lugs on a carrier-plate as such plate reaches the point where it is to be transferred from the second to the third pair of wheels. The latches thus sprung back remain held by the cams F F until the end lugs $d^2$ $d^2$ of the carrier-plate, which they are to engage and support, are seated in the wheel-notches, when the rotation of the wheel carries the cam-engaging bearings on the latches off of the cams, and such latches spring inward to bring their lips or lugs $e^2$ $e^2$ in over the plate-lugs $d^2$ $d^2$. As the third pair of wheels E E continues to revolve the carrier-plates, with their lugs seated in the wheel-notches, will be carried onward, downward, and then upward to the point where they are to be transferred to the fourth or next pair of notched wheels, and until such point is reached the weight of said carrier-plates will be supported by the third pair of wheels and the latches carried by the latter, and there will be no sliding or other friction on the plates or their lugs over supporting-guides to be overcome or to hinder the easy moving along of the plates.

Where the carrier-plates travel along on the under side of the third pair of wheels E E, I arrange my dipping or paraffining device for applying to the splints paraffin or other suitable material with which they are to be treated before the igniting composition to form the match-heads is applied to the splints. The form of this dipping or paraffining device which I prefer is shown best in Figs. 1, 10, and 11. It consists of a jacketed vat H, supported on the frame-uprights A' A', having the central cavity H' to receive the paraffin or other material used, and a jacket inclosing a space around such cavity, which space is to be supplied with hot water or other heating medium through a pipe $h$. Circulation of the water or other medium can be maintained in the usual way by drawing off such water or medium through an outflow-pipe. (Not shown.) There is a vertically-reciprocating frame having a longitudinal plate $H^2$, connected with two cross-bars $H^3$ $H^3$, each of which is connected at its opposite ends with two uprights $H^4$ $H^4$. The upper ends of each of the uprights connected with each bar $H^3$ are themselves connected by a cross-bar $H^5$, which has a downwardly-bent portion to receive and hold a part of a shallow pan $H^6$. The downward bend of the cross-bars $H^5$ $H^5$ is sufficient to cause the pan $H^6$ to be submerged in the liquid contents of the cavity H' when the vertically-reciprocating frame is down in its lowest position and yet allow the top of the pan to be raised well above the vat H when the frame is moved upward. The pan-carrying frame can be guided in its reciprocations up and down in any suitable way; but I prefer to secure its guiding by passing the uprights $H^4$ $H^4$ through guides $H^7$ $H^7$ on the sides of the jacket for the vat, as indicated in Figs. 10 and 11. On the under side of plate $H^2$ are two ears or lugs $h'$ $h'$, carrying a pin $h^2$, which is engaged by a fork $h^3$ on one end of the actuating-lever $h^4$, pivoted at $h^5$ to a suitable support $h^6$ on the frame A A and having its farther end provided with a pin or bearing $h^7$, engaging a cam-groove $h^8$ in the side of cam $h^9$, fixed upon and rotating with shaft $h^{10}$, which is journaled in suitable bearings on the frame A A and is to be driven in any suitable way from the main driving-shaft I of the machine. As indicated in the drawings, (see Fig. 1,) the shaft $h^{10}$ can be driven by a sprocket-wheel $h^{11}$, fixed upon it, and engaged by a sprocket-chain $h^{12}$, which in turn is to be driven by a sprocket-wheel $h^{13}$ on shaft I. This latter sprocket-wheel I have not shown except in dotted lines, as it can be of any desired form or construction adapted to drive the chain $h^{12}$.

I desire it to be understood that I do not limit myself to the above-described means of driving the cam-shaft $h^{10}$, but can use instead any other suitable means or gearing for the same purpose without departing from my invention.

The pan $H^6$ is of a width greater than the length of the rows of splints held in the perforations of the carrier-plates and is of a sufficient extent from its front to its rear edge to accommodate at one time within it the lower ends of the rows of splints in several adjoining carrier-plates. (See Figs. 10 and 11.) With this construction and with the gearing for driving cam $h^9$ arranged to cause a lifting of pan-bearing frame once during the travel of each carrier-plate to carry its several rows of splints by a given point the splints will all be uniformly treated with the paraffin or other liquid contents of the pan $H^6$. The throw of the forked end of lever $h^4$ is such that when the pan descends it is carried well below the surface of the heated contents of the vat H, so that what it takes from the vat and raises to and around the splints will always be hot and thoroughly liquefied.

The series of pairs of notched wheels E E for supporting and moving my carrier-plates in their travel through the machine are driven with a step-by-step motion, each step being of sufficient length to move the carrier-plates through the distance required to move one row of perforations in any one plate away from a given point and bring the next succeeding row of perforations up to such point. This step-by-step rotation of the wheels E E can be secured in any desired way and by any suitable means; but I prefer to secure it in the manner indicated in the drawings. As shown, each of the shafts E' E', which carry the pairs of notched wheels E E, is geared to the adjoining shafts, so that they must all rotate together. Each shaft has fixed to it a gear-wheel $E^2$, meshing with similar wheels $E^2$ $E^2$ on the two shafts to the front and rear of it. There is also attached to each shaft E' a ratchet-wheel $E^3$, the teeth of which are engaged by a pawl $E^4$ on a swinging arm $E^5$, journaled upon the respective shaft E'.

For actuating a number of these pawl-carrying arms simultaneously I pivotally connect them with a reciprocating bar $E^6$, which is reciprocated by a cam $E^7$ having an eccentric cam groove or track $E^8$ engaging a pin or bearing $E^9$ on the bar. Where, as in the machine shown, there are two horizontal series of pairs of wheels E E, one lower and one upper series, and one vertical series connecting the farther ends of the upper and lower series, I prefer to have a separate actuating-bar $E^6$ for each series. In such case the bar for the first or lower series can be actuated by the cam $E^7$, supported on a shaft $E^{10}$, journaled in suitable bearings on a bracket or arm $E^{11}$ on the frame A A, while the actuating-bar for the upright series of wheels can be actuated by a similar cam $E^7$ on shaft $E^{10}$, journaled in suitable bearings on the arm $E^{11}$ on one of the uprights of frame A A. The cam $E^7$ for actuating the bar of the upper series of wheels can be on a shaft $E^{10}$, similarly supported at the front of the machine, or at the rear end of the latter, if desired. As, with the shafts $E' E'$ geared together in the manner indicated hereinbefore, adjoining shafts, with the wheels E E thereon, must rotate in opposite directions, the teeth of the ratchet-wheel on one shaft are turned in a direction opposite to that in which those of the ratchet-wheels on adjoining shafts are turned, the ratchet-wheel-actuating pawls $E^4 E^4$ being correspondingly arranged, (see Figs. 1 and 4,) so that as an actuating-bar $E^6$ moves in one direction alternate pawls in the series will turn their respective ratchet-wheels forward through the distance of one tooth, and as the bar returns the other pawls will correspondingly turn their respective ratchet-wheels.

With all of the shafts $E' E'$ geared together, as described, the application of the rotating power to alternate shafts through the pawls and ratchet-wheels in the manner just above indicated will give a good and satisfactory action in the proper uniform and simultaneous step-by-step rotation of the carrier-plate supporting and moving wheels E E throughout the machine.

The cams $E^7 E^7 E^7$ for actuating-bars $E^6 E^6 E^6$ can be driven in any desired way without involving any departure from my invention. As indicated in the drawings, they can be driven by sprocket-chains $E^{13}$, which are to engage and drive sprocket-wheels $E^{14} E^{14}$ on the shafts $E^{10} E^{10}$, carrying the cams, and be driven by suitable sprocket-wheels $E^{15} E^{16}$ on the main driving-shaft I. These sprocket-wheels to be driven by and to drive the sprocket-chains, I have indicated only in a conventional way in dotted lines, as their construction and arrangement will be perfectly clear to and understood by the mechanic without any detail showing of them, as any other desired form of gearing or means for actuating the cam-carrying shafts could be used without involving any departure from my invention.

After leaving the fourth pair of notched wheels E E the carrier-plates D D, having their lugs $d^2 d^2$ seated in the notches $e e$ of the fifth pair of wheels and held therein by the spring-catches $e' e'$, are carried by the rotation of the wheels of the fourth pair down to the under side of such wheels and over the composition-applying mechanism for treating each match-splint with a quantity of igniting composition sufficient to form a match-head. Such mechanism consists of a composition-containing vat K, provided with a heating-jacket $K'$, which is to be kept supplied with hot water or other heating medium adapted to keep the body of composition $k$ within the vat hot enough to have the desired fluidity. The vat K, supported on the frame-uprights $A^2 A^2$, extends across the space below the fourth pair of wheels E E, being of a width greater than the length of the rows of splints held in the carrier-plates. In connection with this vat there is a vertically-reciprocating frame, which consists of the longitudinal bottom plate $K^2$ below the vat, the two cross-bars $K^3 K^3$, connected with the plate $K^2$, and the uprights $K^4 K^4$, connected with the opposite ends of the cross-bars $K^3 K^3$ and guided in guideways $k' k'$ in the upright plates $A^2 A^2$, upon which the vat is supported. At their upper ends the uprights $K^4 K^4$ are bent inward over the edge of vat K and then downward in planes parallel with and close to the inner sides of the vat ends and support on their lower ends the ends of the horizontal bars $K^5 K^5$, which carry the shallow pan $K^6$ for conveying composition from the vat to the ends of the splints carried by the carrier-plates. This pan is of a width slightly greater than the length of a row of splints in any carrier-plate, and the distance from its front to its rear edge is sufficient to allow the pan to inclose the lower ends of the splints in all the rows in one plate at one time when the pan is raised in the manner to be described. The position of the pan at all points of its movement is vertically underneath a carrier-plate D when such plate has been brought to a horizontal position on the under side of the fifth pair of wheels E E.

For actuating the pan-supporting frame, so as to cause the pan $K^6$ to descend well into the composition in vat K and then rise again to cause the ends of the rows of splints in a carrier-plate D to be immersed in the layer of composition carried by the pan, I provide the under side of plate $K^2$ with ears or lugs $K^7 K^7$, carrying a pin $K^8$, engaged by a fork on one end of the lever $K^9$, which is pivoted at $K^{10}$ in a suitable bearing $K^{11}$ on frame A A and has its other end provided with a roller-bearing $K^{12}$, engaging a cam-groove $K^{13}$ in the side of cam $K^{14}$ on shaft $K^{15}$, driven by sprocket-wheel $K^{16}$, fixed on such shaft, and itself actuated by sprocket-chain $h^{12}$. The cam-groove $K^{13}$ is so shaped and timed with reference to the rotation of main shaft I and the movement of the carrier-plate supporting and moving wheels that the pan $K^6$ is lowered from a point just below the path of the ends of the splints in the carrier-plates to and into the composition in the vat K and then raised to said point, while a carrier-plate D is being moved from its horizontal position on the under side of the fifth pair of wheels E E and the next succeeding plate is being brought into such position by the step-by-step rotation of the plate-carrying wheels. A short sharp downward and upward bend $K^{17}$ in the cam-groove $K^{13}$ then depresses and raises the bearings $K^{12}$ on lever $K^9$ quickly, so as to cause the other end of the lever to raise and lower the pan-carrying frame to bring the pan $K^6$ up to cause immersion of the ends of the four rows of splints carried by the carrier-plate and then lower such pan below such splint ends while the carrier-plate is at rest after the finishing of one of its step-by-step movements and before another of such movements is begun.

In order to scrape off any excess of composition from the pan $K^6$ and to level off the layer of composition held within it, so that the splints will be uniformly dipped, I provide a scraper and leveler L, consisting of a bar extending across the vat K, and when the pan $K^6$ is down resting near its opposite ends upon the edges of the vat. Just beyond the parts of this bar which are to rest on the vat edges such bar has the squared portions $l\ l$ engaging and sliding in the horizontal slots $l'\ l'$ in the plates L' L', which slide vertically up and down in guideways $L^2\ L^2$ in the upright plates $A^2\ A^2$. Beyond these squared portions $l\ l$ the scraper-bar L has the rounded ends $l^2\ l^2$ engaging the slots $l^3\ l^3$ in plates $A^2\ A^2$, each of which slots has a long inclined portion at an angle to the line of travel of the pan $K^6$ and a short vertically-extending portion at the upper end of the inclined part. (See Figs. 12 and 13.) These slots are so arranged that as the pan $K^6$ is being raised and engages the scraper-bar L, so as to carry the same upward above the vat-top, the inclined portions of the slots will cause the bar to move across the top of the pan to remove therefrom all composition standing above the pan edges. The inclined portions of the slots are of such length as to cause the bar to be moved completely over the pan, beyond the edge thereof, to uncover the layer of composition before the hereinbefore-described quick vertical movement of the pan to apply the composition to the match-splint ends takes place. The short vertical portions of slots $l^3\ l^3$ allow the scraper-bar L to remain without sidewise move during the quick upward and downward movement of the pan $K^6$ while the carrier is at rest, so that such movement may be free and unretarded in any way. The squared portions $l\ l$ on the bar L, engaging the horizontal slots $l'\ l'$ in the vertically-sliding plates L' L', serve to prevent rotation of the bar, while leaving it free to move horizontally with reference to such plates L' L' and the pan $K^6$. As the pan descends toward and into the vat the plates L' L' also descend and carry the scraper-bar L down with them and cause its rounded end portions $l^2\ l^2$ to first move down through the short vertical upper part of slots $l^3\ l^3$ and then down along the inclined parts of such slots, which will cause the bar to travel transversely across the plates L' L' until the bar reaches its lowest position, rests upon the upper edge of vat K, and stands with its composition-scraping part outside of the vertical plane of travel of the inner face of the front side of pan $K^6$. If desired, in order to prevent friction and make the movement of the scraper-bar most easy I contemplate providing the projecting ends $l^2\ l^2$ of the bar with rollers to engage the slots $l^3\ l^3$.

I desire it to be understood that instead of having the composition-applying mechanism arranged to operate upon the splints in the plates engaged by the fifth pair of wheels E E, as shown and described, such mechanism can be placed farther away from the paraffining or other preliminary treatment devices, so as to act upon the splints in plates carried by a pair of wheels E E, like the fifth pair, farther along in the series of plate carrying and moving wheels.

As shown in the drawings, the carrier-plates D D, after passing around under the fifth pair of wheels and being brought by the latter up to a certain point, are transferred from the notches of such wheels to those of the next succeeding wheels E E by shifting or transfer guides G G, like those described hereinbefore as used to transfer the plates from the first pair of wheels to the second and from the third to the fourth pair. Latch-tripping cams F F, similar to those hereinbefore described, serve to trip the latches $e'\ e'$ and hold them away from the lugs $d^2\ d^2$ of each carrier-plate when such plate reaches the place where it is to be shifted in the manner described to the next succeeding pair of wheels E E. From such pair of wheels the carrier-plates are shifted in the same manner by guides G G to the seventh pair of wheels, which are constructed like the described first, third, and fifth pairs of wheels, having the same arrangement of latches $e'\ e'$ and cams for tripping the latter. From the seventh pair of wheels the carrier-plates pass upward, traveling alternately around the inner and outer sides of the several pairs of wheels in the vertical series of plate supporting and carrying wheels E E. These wheels of the vertical series are not provided with latches $e'\ e'$ to engage the carrier-plate lugs $d^2\ d^2$, but are simple notched wheels like the second pair of the lower horizontal series hereinbefore described.

In the case of the vertical series of pairs of wheels E E the guide-strips G G serve not only to transfer the carrier-plates from one pair of wheels to another like the guide-strips already described, but also serve for a small portion of the travel of the carrier-plates to support and keep the plates, with their lugs $d^2$ $d^2$, seated in the notches of the wheels. Throughout the greater part of the upward travel of plates the weight of the latter is supported entirely by the wheels E E and causes no retarding friction on the guide-strips. Having reached the end of the vertical series of pairs of wheels, the carrier-plates continue on to the upper horizontal series of pairs of wheels, passing first along the under side of one pair of wheels, over the upper side of the next pair, along the under side of the next pair, and so on throughout the series, transfer guide-strips G G being used, as before, to shift the plates from one pair of wheels to another, and each pair of wheels, along the under side of which the plates are to pass, having a series of latches $e'$ $e'$ like those already described, one for each notch $e$, to retain the respective plate-lug $d^2$ in such notch and cams F F to trip the latches to allow the plates to be transferred to and from the wheels the same as in the case of the first, third, fifth, and seventh pair of wheels hereinbefore described. From the last pair of wheels E E at the front end of the upper horizontal series the carrier-plates, with the matches held in them, pass vertically downward between pairs of guides $G^2$ $G^2$, supported by arms $A^3$ $A^3$ on the frame A A and adapted to engage the front and rear sides, respectively, of the plain unperforated portions $d'$ $d'$ of the carrier-plates. Guided between these guides $G^2$ $G^2$ and resting one upon the other the carrier-plates D D slide down, so that their lugs enter the notches $e$ $e$ of the first pair of wheels E E again, and such wheels will move them onward to and past the splint cutting and sticking devices, which will fill the plate-rows again with splints in the manner hereinbefore set forth.

In order to insure the proper seating of the lugs $d^2$ $d^2$ of the respective carrier-plates D D in the proper notches of the wheels E E, the guide-strips G G have their upper ends bent outward at a slight angle, (see Fig. 2,) and below this bent portion each strip is curved in a plane concentric with the wheels E E and has its inner or rear face substantially in the same plane with the outer periphery of the portions of the wheels, which are between the notches $e$ $e$. Cams F F like those hereinbefore described serve to trip or force back the latches $e'$ $e'$, so as to allow the passage of the plate-lugs $d^2$ $d^2$, the latches passing off of such cams and snapping in over the plate-lugs as the wheels E E continue their step-by-step revolution. On their downward travel between the guides $G^2$ $G^2$ the carrier-plates, filled with matches, are brought to an ejector, which serves to discharge the matches from the carrier-plates before the latter reach the wheels E E again. Such ejector can be of any desired construction, properly adapted to operate to discharge a row of matches from a plate each time that the plate comes to rest after one of its step-by-step movements.

The ejector shown in the drawings (see Figs. 1, 2, and 3) is like that fully shown and described in the Beecher patent, hereinbefore referred to, consisting, essentially, of a reciprocating head M, having a plate M', carrying a series of punch-pins $m$ $m$, one for each of the perforations $d$ $d$, in a single row in the carrier-plates D D, such pins being situated so as to be in line with the respective perforations in any row as such row is brought by the movement of the respective plate D opposite a given point. This point is one at which the successive rows of perforations successively come to rest during the step-by-step progress of the carrier-plates, due to the described step-by-step rotation of the series of pairs of plate supporting and moving wheels E E. A fixed plate $M^2$, supported from frame A A and having a series of holes $m'$ $m'$ for the respective punch-pins, serves to guide the pins into the perforations of the carrier-plate to eject a row of matches therefrom as the head moves outward toward such carrier-plate. The head M can be guided and supported in any desired way. As shown, it is guided and supported upon a plate $M^3$ and is reciprocated back and forth by rods $M^4$ $M^4$, connected at one end with the head and at the other end pivotally connected with arms $M^5$ $M^5$ on a rock-shaft $M^6$, journaled in bearings $M^7$ $M^7$ on frame A A. This rock-shaft is actuated by rod $M^8$, connected with an arm $M^9$ on the shaft, and itself actuated by an arm $M^{10}$, pivotally connected with its lower end. This arm $M^{10}$ is rigidly connected with a swinging arm $M^{11}$, which in turn is actuated by a cam $M^{12}$ on the main driving-shaft I, all as fully explained in the Beecher patent above referred to. The construction and operation of the ejecting mechanism being fully described in such patent need not be set forth any further in detail herewith.

The number of pairs of wheels E E which support and move the carrier-plates after the splints in the latter have been supplied with the match-head-forming portions of igniting composition by the composition-applying devices should be sufficient to make the travel of the plates long enough to give the match-heads time to cool, dry, and harden before the matches are discharged from the carrier-plates by the ejector.

Obviously the number of the pairs of wheels used can be increased as desired to make the travel of the plates after the composition is applied to the splints continue for any required length of time.

Instead of making my carrier of a series of plates with rows of perforations to receive and hold the splint ends, as shown in the drawings and described hereinbefore, I contemplate using, where desired, plates, bars, or narrow racks provided with means other than perforations for receiving and holding portions of the splints. The wheels E E and transfer and guiding means could then operate in connection with and upon the plates, bars, or frames just as they do on the perforated carrier-plates D D.

The operation of my machine shown and described in this application, which will be understood from the foregoing description and the drawings, is as follows: The carrier-plates D D, passing down between the vertical guides $G^2 G^2$, are by the upper ends of guides G G guided so that the lugs $d^2 d^2$ on the opposite ends of each plate will enter and be seated in corresponding notches $e e$ of the first pair of wheels E E, the latches $e' e'$ for such notches being held back out of way of the plate-lugs by the cams F F. Being carried past the cams by the rotation of the wheels E E, the latches snap inward to carry their lips $e^2 e^2$ into engagement with the plate-lugs to hold such lugs in the wheel-notches. The step-by-step movement of the wheels E E brings the plates D D, whose lugs are engaged by the wheel-notches, down over the splint cutting and sticking mechanism. While a carrier-plate is over such mechanism and is being moved with a step-by-step movement to bring its rows of perforations successively over the path of a row of splints carried upward by the splint cutting and sticking devices it is caused to stand in a plane exactly at right angles to the plane of travel of such devices by guide-plates D' and the guide-bar $D^2$. After having its rows of perforations supplied with splints each plate is carried onward and upward by the wheels E E and transferred to a second pair of wheels E E, from which it is delivered to the third pair, which, like the first pair of wheels, is provided with plate-lug-engaging latches. This third pair of wheels carries the plate to and past the paraffining mechanism or means for treating the splints preliminary to the application of the igniting compound. From the third pair of wheels E E the plate passes alternately over pairs of notched wheels without latches and under pairs of notched wheels with such latches $e' e'$, so that the whole weight of the plate is supported by or from the wheels, and there is no retarding sliding friction due to the weight of the plate pressing it or part of it down upon supporting-guides. While passing along the under side of one pair of wheels and supported therefrom by the latches $e' e'$ on the wheels, the plate comes to rest after one of its step-by-step forward movements directly over the composition-applying device, the pan or tray of which carrying a layer of composition is, while the plate is at rest, quickly raised to cause the lower ends of all of the rows of splints carried by the plate to be submerged in the composition layer, and then is lowered again to take it away from the splint ends before the plate starts forward again. From the end of the horizontal series of pairs of wheels E E the plate then passes alternately around the inner and outer sides of the pairs of wheels in the upright series, and, passing up over the upper pair of wheels in such series, travels alternately under and over the pairs of wheels in the upper horizontal series. As in the case of the lower horizontal series each pair of wheels along under which the plate is to pass is provided with the plate-lug engaging and supporting latches $e' e'$ to support the weight of the plate while it is passing along under the wheels and until it comes to the place of transfer to succeeding pair of wheels over which it is to pass. The same form of plate-transferring guides and latch-tripping cams is used in the upper horizontal series as in the lower series. The plate having passed over the last pair of wheels in the upper series drops down between guides $G^2 G^2$ upon the carrier-plate next preceding it, and the series of plates resting one upon the other between such guides is by the step-by-step movement of the series of pairs of wheels E E allowed to move downward with a step-by-step motion, each step being of such length as to move a plate to take one row of perforations therein from a given point and bring the next succeeding row of perforations exactly up to such point. This will, when a carrier-plate comes to the reciprocating ejector with its match-ejecting pins, bring the rows of perforations in the plate successively opposite the pins of the ejector, so that at each outward movement of the latter its rows of pins will enter and punch the matches out of a row of the plate-perforations.

It will be noticed that in my machine the sliding friction of the carrier-plates or any part of them upon any supporting-guides is reduced to a minimum.

Throughout nearly all the travel of the carrier-plates sliding friction due to the weight of the plates pressing them down on guides is prevented and the weight of the plates is supported either directly by the wheels or by devices carried by the latter.

Having thus described my invention, what I claim is—

1. In a match-making machine, in combination with a series of separate splint-carrying devices, each having means for holding one or more rows of splints, two traveling carriers for the splint-carrying devices, having notches to engage portions of such devices and move them along, and latches on the carriers to engage portions of the splint-carrying devices and support the same adapted to be moved to disengage such portions, substantially as described.

2. In a match-making machine in combination with a series of separate splint-carrying devices, each provided with means for holding a row of splints, a pair of rotating wheels provided with notches to receive portions of such devices, and movable devices to engage and hold the splint-carrying devices with their portions in the notches of the wheels adapted to be moved to release the splint-carrying devices, substantially as described.

3. In a match-making machine, in combination with a series of separate splint-carrying devices, each provided with means for holding a row of splints, a pair of rotating wheels provided with notches to receive portions of such devices, latches on the wheels to engage and support portions of the splint-carrying devices, and means for tripping such latches, substantially as described.

4. In a match-making machine, in combination with a series of separate splint-carrying devices, each provided with means for holding a row of splints, a pair of rotating wheels having notches to receive portions of the splint-carrying devices, and spring-latches carried by the wheels to engage and support portions of the splint-carrying devices, substantially as described.

5. In a machine for making matches, in combination with a series of separate splint-carrying devices, each provided with means for holding a row of splints, a pair of rotating wheels having notches to receive portions of the splint-carrying devices, and spring-latches carried by the wheels to engage and support portions of the splint-carrying devices, and means for tripping the latches, substantially as described.

6. In a match-making machine, in combination with a series of separate splint-carrying devices, each provided with means for holding one or more rows of splints, a series of pairs of rotating wheels having notches to engage portions of the splint-carrying devices, the pairs of wheels being placed with their notched peripheries close together and having their notches so arranged, that the splint-carrying devices can pass from the notches of one pair of wheels directly into those of the succeeding pair, and means for shifting the splint-carrying devices from one pair of wheels to another, substantially as and for the purpose described.

7. In a match-making machine in combination with a series of separate splint-carrying devices, a series of pairs of rotating wheels placed close together and having notches to engage portions of the splint-carrying devices, the notches in each pair of wheels being adapted to come opposite those of the next pair in the series, and inclined guides to engage and shift the splint-carrying devices from the notches of one pair of wheels into those of the succeeding pair, substantially as and for the purpose described.

8. In a match-making machine, a series of separate splint-carrying devices, each provided with means for holding one or more rows of splints, a series of pairs of rotating wheels having notches to engage portions of the splint-carrying devices, and inclined guides to engage and shift the splint-carrying devices from one pair of wheels to another, as the wheels rotate, substantially as described.

9. In a match-making machine, in combination with a series of splint-carrying devices, each having means for holding one or more rows of splints, a pair of rotating wheels having notches to engage portions of the splint-carrying devices, latches on the wheels to engage portions of such devices, means for tripping such latches, transfer-guides to move the splint-carrying devices, to take their notch-engaged portions out of engagement with the notches of the wheels, and a second pair of rotating wheels having notches to receive portions of the splint-carrying devices, when the latter are shifted away from the first wheels, substantially as described.

10. In a match-making machine in combination with a series of splint-carrying devices, each having means for holding one or more rows of splints, a series of pairs of rotating wheels in which adjoining pairs rotate in opposite directions, the wheels of each pair being provided with corresponding notches to engage portions of the splint-carrying devices, guides for shifting the latter from one pair of wheels to the next succeeding pair, latches on the pairs of wheels under which the splint-carrying devices pass, to engage and support portions of such devices, and means for tripping such latches at the points where the splint-carrying devices are transferred to and from the latch-carrying wheels, substantially as described.

11. In a match-making machine, in combination with a series of splint-carrying devices, each having means for holding one or more rows of splints, a series of pairs of rotating wheels, in which adjoining pairs of wheels rotate in opposite directions, each wheel having notches to engage portions of the splint-carrying devices, guides to shift such devices from each pair of wheels to the next succeeding pair, latches on alternate pairs of wheels to engage and support portions of those splint-carrying devices which are engaged by the notches of such wheels, and cams to trip and hold back the latches for awhile, at the points where the shifting-guides shift the splint-carrying devices to and from the latch-carrying wheels, substantially as described.

12. In a match-making machine, in combination with a series of splint-carrying devices, each having means for holding one or more rows of splints, a series of rotating wheels upon or from which the splint-carrying devices are supported, such pairs of wheels being placed close together, so that the splint-carrying devices can be transferred directly from one to another, and inclined guides to engage and shift such devices from one of the wheels to another, as the wheels revolve, and means for giving the wheels a simultaneous step-by-step motion, substantially as described.

13. In a match-making machine, in combination with a series of splint-carrying devices, each having means for holding one or more rows of splints, a pair of rotating wheels having notches to engage portions of the splint-carrying devices, guides to guide such devices to cause their notch-engaging portions to move into and out of the wheel-notches, the spring-latches in the wheels and cams to force back such latches out of the way of the splint-carrying devices, where the notch-engaging portions of the latter are moved into and out of the wheel-notches, substantially as described.

14. In a match-making machine in combination with a source of supply of splints adapted to move them endwise in a row, a series of splint-carrying devices, each having means to hold one or more rows of splints, a pair of rotating wheels having notches to engage portions of the splint-carrying devices, latches to engage and support portions of the splint-carrying devices, and means for rotating the wheels to bring the means for holding rows of splints on the splint-carrying devices successively over the source of supply of splints, in position to receive a row of splints therefrom, substantially as described.

15. In a match-making machine, in combination with a source of supply of splints, adapted to move them endwise in a row, a series of splint-carrying devices, each having means for holding two or more rows of splints, a pair of rotating wheels having notches to engage portions of the splint-carrying devices, latches on the wheels to engage and support portions of such devices, means for rotating the wheels with a step-by-step rotation, to bring the means for holding separate rows of splints on the splint-carrying devices successively up to a position in line with the travel of the splints in the source of supply of the latter, and guides engaging the splint-carrying devices and causing them to move in a straight line, while they are over and are passing the source of supply of splints, substantially as described.

16. In a match-making machine in combination with a series of splint-carrying devices having means for receiving and holding one or more rows of splints, means for inserting rows of splints in such carrying devices, a pair of rotary wheels supporting and moving the splint-carrying devices past the splint-inserting means, and guides to engage the splint-carrying devices and cause them to rock, with reference to the wheels, when passing over the splint-inserting means, so that their splint-receiving devices will be presented properly in line with the splint-inserting means, substantially as and for the purpose described.

17. In a match-making machine, in combination with a series of splint-carrying devices, each having lugs and means for holding one or more rows of splints, a pair of rotating wheels having notches to engage such lugs, and latches on the wheels to support such lugs and hold them in the wheel-notches, substantially as described.

18. In a match-making machine, in combination with a series of splint-carrying devices, each having lugs and means for holding one or more rows of match-splints, a pair of rotating wheels having notches to engage the lugs on the splint-carrying devices, latches on the wheels to support such lugs and hold them in the wheel-notches, and cams to force such latches away from the lugs, substantially as described.

19. In a match-making machine, in combination with a series of splint-carrying devices, each having lugs and means for holding one or more rows of splints, rotating wheels having notches with convex bottoms to engage the lugs on the splint-carrying devices, means for supplying the splints in rows, and guides to cause the splint-carrying devices to travel in a straight line, when opposite the splint-supplying means, substantially as described.

20. In a match-making machine, in combination with a series of splint-carrying devices, each having lugs and means for holding one or more rows of splints, wheels having notches with convex bottoms to engage the lugs on the splint-carrying devices, latches carried by the wheels to support such lugs and hold them in the wheel-notches, guides to engage the splint-carrying devices and cause them to travel in a straight line, during a portion of their movement with the notched wheels, means for rotating the wheels with a step-by-step movement, and means for thrusting match-splints in rows into the splint-holders on the carrying devices, substantially as described.

21. In a match-making machine, in combination with a series of splint-carrying plates, each having lugs on its opposite ends and one or more rows of splint-receiving perforations, a pair of wheels having notches to receive the lugs on the plates, latches on the wheels to engage and support the lugs in the wheel-notches, means for giving the wheels a step-by-step rotation, and splint-supplying mechanism arranged to thrust rows of splints into the rows of perforations in the plates, as such rows of perforations are brought opposite it by the movement of the notched wheels, substantially as described.

22. In a match-making machine, in combination with a series of splint-carrying plates, each having end lugs and several rows of splint-receiving perforations, a pair of wheels provided with notches with convex bottoms to engage the plate-lugs, latches on the wheels to engage such lugs and support them in the wheel-notches, guides between which the plates are passed by the rotation of the wheels, adapted to cause such plates to travel in a straight line, while at and passing a given point, a splint-supplying mechanism to thrust the splints in rows into the rows of perforations in the carrier-plates, as such rows are successively brought up to such given point by the rotation of the wheels, and means for rotating the latter, substantially as described.

23. In a match-making machine, in combination with a series of match-splint carriers provided with means for receiving and holding match-splints, a series of pairs of wheels having notches to engage portions of the carriers, the pairs of wheels being placed close together so that the splint-carriers can be transferred directly from one pair to the next succeeding one, means for transferring such carriers from each pair of wheels to the next succeeding pair, gearing connecting the pairs of wheels, and means for rotating the wheels with a step-by-step rotation, substantially as described.

24. In a machine for making matches, in combination with a series of splint-carriers provided with means to receive and hold match-splints, a series of pairs of wheels with notches to engage portions of the carriers, the pairs of wheels being placed close together in the series and having their notches arranged so that those in one pair of wheels come opposite those in the next pair, means for guiding the carriers from the notches of one pair of wheels to those of the next pair, gearing connecting the pairs of wheels, ratchet-wheels connected with the notched wheels, movable arms carrying pawls to engage and actuate the ratchet-wheels, and means for moving such arms simultaneously, substantially as described.

25. In combination with a series of pairs of notched wheels, and a series of splint-carrying devices adapted to be engaged by the notches in the wheels, intermeshing gearing rotating with the pairs of wheels, and gearing the latter together, a ratchet-wheel connected with each pair of notched wheels, a swinging arm for each ratchet-wheel provided with a pawl to engage the latter, a reciprocating bar connected with the several ratchet-arms, so as to actuate the same, as the bar reciprocates, and means for reciprocating the bar, substantially as described.

26. In a match-making machine, in combination with a series of match-splint carriers provided with means for receiving and holding the splints, a series of pairs of wheels provided with notches to engage portions of the carriers, such pairs of wheels being placed close together in the series, so as to bring the notches in one pair close to those of the next succeeding pair, means for shifting the carriers from one pair of wheels to the next succeeding pair, gearing rotating with the pairs of wheels and meshing together, so as to gear adjoining pairs of wheels together, ratchet-wheels connected with the pairs of notched wheels, swinging arms carrying pawls to engage and actuate the ratchet-wheels, a moving bar connected with the pawl-carrying arms, so as to cause them to swing simultaneously, and means for actuating the bars, substantially as described.

27. In a composition-applying mechanism for match-making machines, in combination with a vat containing the composition, a rising and falling frame, carrying a pan to take a layer of composition from the vat, means for raising and lowering such frame, a movable scraper, to remove excess of composition from the pan, situated and moving always above the vat contents, and means for causing such scraper to move across the pan, as the latter is raised from the vat, substantially as described.

28. In a composition-applying mechanism for match-making machines, in combination with a vat for the composition, a rising and falling frame carrying a pan to take a layer of composition from the vat, means for raising and lowering such frame, a scraper-bar moved upward by the raising of the pan, and inclined slots in stationary pieces, to engage portions of the bar and cause the latter to move across the pan, as it rises, substantially as described.

29. In combination with the vat for the composition, a rising and falling frame, a pan on the latter to take composition from the vat, means for raising and lowering the frame, the scraper-bar, a support for the bar, when the pan is down in the composition, and stationary pieces having inclined guides to engage portions of the bar and guide the latter across the pan, as the latter rises, substantially as described.

30. In combination with the vat for the composition, the pan for taking a layer of composition therefrom, means for moving such pan to submerge it in and raise it above the composition in the vat, the scraper-bar, and supports carrying inclined slots engaging bearing projections on bar ends to cause the bar to travel to and fro across the pan, as the bar rises and falls, substantially as described.

31. In combination with the vat for the composition, the pan for taking a layer of composition therefrom, means for moving such pan to submerge it in and raise it above the composition in the vat, the scraper-bar, supports carrying inclined slots engaging portions of the bar, to cause it to move across over the pan as it rises and falls, and the sliding plates having horizontal slots engaging portions of the bar, substantially as described.

32. In combination with a vat for the composition, the pan for taking a layer of composition therefrom, means for moving such pan to submerge it in and raise it above the composition in the vat, the scraper-bar, supports provided with inclined slots to engage portions of the bar at or near the opposite ends thereof, and upright slots at the upper ends of the inclined slots, and vertically-sliding plates, having horizontal slots also engaging portions of the scraper-bar, substantially as described.

33. In combination with a vat for the composition, the pan for taking a layer of composition therefrom, means for lowering and raising the pan to submerge it in and raise it above the vat contents, the scraper-bar, supports having inclined slots engaging portions of the bar, and vertically-sliding plates, guided in suitable ways on such supports, and having transverse slots engaging squared portions of the scraper-bar, substantially as described.

34. In combination with a vat for composition, the pan for taking a layer of composition therefrom, a reciprocating frame carrying the pan, means for lowering and raising such frame, the scraper-bar, vertically-reciprocating plates having transverse slots through which the bar passes, near its opposite ends, and the stationary supports having slots engaging portions of the bar at or near its ends, such slots having corresponding inclined portions with short vertical portions at the upper ends of the inclines, substantially as described.

35. In a match-making machine, in combination with a carrier for the splints, having a series of holders to receive and hold the splints and means for moving the same, with a step-by-step movement, so as to bring the series of splint-holders successively up to and past a given point, a composition-containing vat, a pan for taking a layer of composition therefrom and raising it to and around the splint ends, such pan being of sufficient extent to include within it the ends of the splints in several of the holders at a time, means for lowering and raising the pan adapted to move it slowly to immerse it in the vat contents, then raising it to a point just below the splint ends during the period required to give the splint-carrier several of its step-by-step movements and then giving it a quick up-and-down movement, to cause immersion of the splint ends in the layer of composition and lower the pan below the splint ends, while the carrier is at rest, after one of its step-by-step forward movements, substantially as described.

36. In a match-making machine, in combination with splint-carriers having means for receiving and holding the splints in rows, and means for moving such carriers with a step-by-step movement to bring the rows of splints successively up to a given point, a composition-containing vat, a pan to take a layer of composition therefrom and raise it, so that the lower ends of splints in the carrier will be immersed therein, such pan being of sufficient extent to cause the ends of several rows of splints to be immersed at a time, means for moving such pan adapted to move it slowly to immerse it in the vat contents and raise it again to a point just below the ends of the splints carried by the carrier, while the carrier is moving through several of its step-by-step movements, and the intervening period or periods of rest, and then to move it quickly up and down, during one of the periods of rest of the carrier, substantially as described.

37. In a match-making machine in combination with a series of splint-carrying devices, each having means for receiving and holding several rows of splints, means for moving such carrying devices, with a step-by-step movement, a composition-containing vat, a pan adapted to take a layer of composition therefrom of sufficient extent to dip the ends of all of the splints held in any one of the splint-carrying devices, means for moving the pan, adapted to move it to immerse it in the contents of the vat and then raise it to a point just below the path of the lower ends of the splints, while a splint-carrying device is being moved through several of its step-by-step movements to bring it directly over the pan, and then to give such pan a quick up-and-down movement, to cause immersion of all the splints of such carrying device in the layer of composition and return of the pan to a position below the splint ends, while the splint-carrying device is at rest, after one of its step-by-step movements.

In testimony that I claim the foregoing I have hereunto set my hand this 16th day of July, A. D. 1897.

FRED M. CLOUGH.

Witnesses:
ALMOND SMITH,
WARREN D. LEE.